United States Patent [19]

Bolgiano et al.

[11] Patent Number: 4,855,165
[45] Date of Patent: Aug. 8, 1989

[54] METHOD FOR MAKING STAIN AND SCRATCH RESISTANT RESILIENT SURFACE COVERINGS

[75] Inventors: Nicholas C. Bolgiano, Lancaster; Mary B. Grubb, Landisville; Raymond S. Hudson, Lancaster; William T. Sigman, Quarryville, all of Pa.

[73] Assignee: Armstrong World Industries, Inc., Lancaster, Pa.

[21] Appl. No.: 195,654

[22] Filed: May 18, 1988

Related U.S. Application Data

[62] Division of Ser. No. 22,952, Mar. 6, 1987, Pat. No. 4,781,987.

[51] Int. Cl.⁴ .................. B05D 1/36; B05D 3/02; B05D 7/00

[52] U.S. Cl. .................. 427/393.5; 427/412.1; 427/412.4

[58] Field of Search .............. 427/393.5, 412.1, 412.4; 428/424.6, 425.3, 480, 483, 524

[56] References Cited

U.S. PATENT DOCUMENTS

4,332,859 6/1982 Funaki et al. ............... 427/412.1 X
4,528,344 7/1985 Chang ........................... 528/254 X

*Primary Examiner*—Michael Lusignan

[57] ABSTRACT

Resilient surface coverings having improved scratch and stain resistance are disclosed in which a first top layer of a thermally-cured composition of a polyol component, an aminoplast component and an acid catalyst is adhered to a crosslinked or crosslinkable second layer material. A process to prepare such surface coverings is also disclosed.

15 Claims, 1 Drawing Sheet

ND SCRATCH
METHOD FOR MAKING STAIN AND SCRATCH RESISTANT RESILIENT SURFACE COVERINGS

CROSS-REFERENCE TO RELATED APPLICATION

This is a division, of application Ser. No. 22,952, filed Mar. 6, 1987, now U.S. Pat. No. 4,781,987, patented Nov. 1, 1988.

The present invention relates to surface coverings, and more particularly to surface coverings which have improved scratch and stain resistance.

BACKGROUND OF THE INVENTION

Resilient surface coverings, and in particular resilient floor coverings, are well known in the art. The floor coverings which are in wide use today are primarily of vinyl construction and, although they can be constructed to have varying degrees of flexibility, they are "resilient" when compared to conventional natural materials, such as ceramic tile. A variety of such products are commercially available and these products have proven to exhibit good wear resistance; however, such coverings are not without certain deficiencies. For example, although vinyl flooring products are durable and stain resistant, they nevertheless tend to lose their glossy appearance through wear. A high-gloss appearance for a floor covering is often desired. Accordingly, the manufacturers of such materials have long sought to find improved floor coverings which exhibit good gloss retention.

One method of providing improved gloss retention is through the application of polyurethane or other wear layers to vinyl flooring structures. Such materials are durable and relatively scratch resistant, and they tend to retain their high-gloss appearance over a longer period of time than do vinyl-surfaced flooring structures. Nevertheless, these wear layers, and in particular polyurethane wear layers, also have certain drawbacks. For example, they are more susceptible to staining; thus, when exposed to common household stains as ballpoint pen, lipstick, mustard, shoe polish and the like, polyurethane coatings tend to be more easily stained than vinyl coatings.

In recent years, the coatings industry has expended considerable effort to develop new and different types of urea or melamine-formaldehyde resins, often referred to as aminoplasts. Such materials may be urea-based or they may be melamines (triaminotriazines) which have been N-alkylated with formaldehyde to provide a methylolated or partially methylolated melamine. The methylol groups are then etherified or partially etherified to provide a crosslinking agent. Such materials have found wide use in coatings for automobiles, appliances and other fairly rigid types of surfaces, and they have also been used in coatings for certain flexible substrates including paper, paperboard, metal foils, cellophanes and the like. However, such materials have never been successfully applied to flooring structures, and in particular to vinyl flooring structures.

Accordingly, one objective of the present invention is to provide resilient surface coverings with protective surfaces which will deform in response to the application of physical stresses on the surface coverings, yet will provide improved scratch and stain resistance.

Another objective of the present invention is to provide flooring structures comprising composite wear surfaces whereby the wear layer material is provided with an improved scratch and stain-resistant character.

These and other advantages of the present invention will become apparent from the detailed description of preferred embodiments which follows.

SUMMARY OF THE INVENTION

The present invention relates to surface coverings, and in particular to floor coverings which comprise treated polyurethane or other crosslinked wear layers. By forming a coating comprising an aminoplast component, a polyol component, and an acid catalyst component on a crosslinked or crosslinkable wear surface and thermally curing the coating, surface coverings are produced which exhibit surprising resistance to common household stains, and also improved scratch resistance.

DETAILED DESCRIPTION OF PREFERRED EMBODIMENTS

Figure 1:
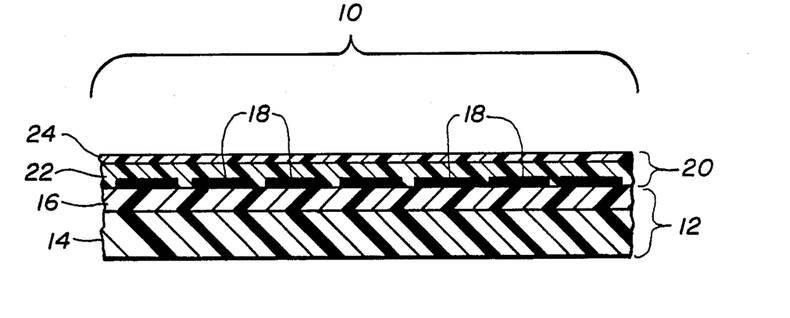
The drawing shows a cross-sectional view of a portion of resilient surface covering having the coating of the present invention.

In the drawing, a portion of resilient surface covering, represented generally as (10), is shown in cross-section. The surface covering (10) comprises a resilient support surface (12), itself comprised of a substrate material (14) and a layer of foamed or non-foamed material, such as vinyl, illustrated as (16). Decorative material, such as a print layer, plastisol material, or the like, on the surface of the support surface (12) are illustrated as (18).

With continued reference to the drawing, a clear wear layer portion is represented as (20), itself comprising a first top layer material (24), which is the coating of the present invention, and a crosslinked underlying material (22) adhered to the support surface (12).

In one embodiment, the present invention relates to a resilient surface covering, said covering comprising a resilient support surface; and a resilient wear layer residing on said support surface, said wear layer comprising a first top layer material and a crosslinked underlying second layer material adhered to said support surface, said first layer material being obtained from the thermal curing of a composition comprising a polyol component, an aminoplast component, and an acid catalyst component while in contact with crosslinked or uncrosslinked second layer material, said first layer material having the ability, when thermally cured, to conform to physical deformations of said cured second layer material and having improved scratch and stain resistance properties relative to the properties of a crosslinked second layer material.

In a second embodiment, the present invention relates to a process for providing a resilient surface covering, said process comprising the steps of providing a resilient support surface; providing a crosslinked or crosslinkable second layer material on said support surface; coating said second layer material with a solution or dispersion comprising a polyol component, an aminoplast component, and an acid catalyst component; drying the coating; and subjecting the composite to thermal curing conditions, provided that (a) for a moisture-crosslinkable second layer material, said layer material may optionally be cured before application of said aminoplast component or at the time of curing of said aminoplast component, and that (b) for a radiation-crosslinkable second layer material, said layer material may optionally be cured before application of said aminoplast component, while said aminoplast component or dried uncured aminoplast composition resides on said layer material, or after thermal curing of said aminoplast composition, whereby said wear layer comprises a first top layer material which has the ability to conform to physical deformations of said crosslinked second layer material, said wear layer having improved scratch and stain resistant properties relative to the properties of a crosslinked second layer material.

Surface coverings which may be treated according to the present invention are those wear layer-coated surface coverings which are presently well known in the art. Examples of such materials are resilient sheet and tile goods comprising crosslinked wear layers, such a those derived from urethanes, acrylated or methacrylated urethanes, unsaturated polyesters, and the like, all of which are well known in the art. These wear layers are typically crosslinkable by moisture-curing techniques, radiation-curing techniques, or a combination thereof. The underlying resilient support surface will typically be of standard vinyl construction. Such materials may be derived from backing material, plastisols, foamed plastisols, randomly dispersed vinyl particles, stencil disposed vinyl particles, and the like, the selection of such materials being well within the skill of an ordinary artisan. Structures comprising the support surface and the wear layer can be prepared by standard means well known in the art and then exposed to treatment by coatings of the present invention.

The aminoplast component consists of ureaformaldehyde and melamine-formaldehyde resins which may be used to practice the present invention. These are referred to herein as "aminoplasts". These materials may be urea-based or they may be melamines which may be partially or substantially methylolated, and the methylol groups may be partially or substantially etherified with methyl, ethyl, propyl, butyl, pentyl, hexyl, heptyl, octyl, nonyl, and decyl groups, isomers of these moieties, and mixtures thereof. Preferably, highly methylolated and highly alkylated melamine aminoplasts will be utilized, hexamethoxymethyl melamine being especially preferred. Many of the aminoplasts which may be used to practice the present invention are commercially available and are sold, for example, as Cymel crosslinking agents by the American Cyanamid Company and as Resimene resins by the Monsanto Company.

The polyol component which may be used to practice the present invention include alcohols which comprise two or more alcohol groups and compositions such as polymeric aqueous dispersion or emulsion resins containing reactive hydroxy and carboxyl functionality as are commercially available and well known in the art. Mixtures of alcohols and reactive aqueous resins are useful as well as mixtures of reactive aqueous dispersion resins, such as reactive epoxy, acrylic and polyurethane dispersion resins. For example, 1,6-hexanediol, 1,4cyclohexane dimethanol, glycerine, neopentyl glycol, tripropylene glycol, 1,4-butanediol, trimethylolpropane, pentaerythritol, and many other polyols may be utilized to practice the present invention.

The acid catalyst component which may be used to catalyze the thermal curing reaction between the melamine aminoplast component, the polyol component, and the surface of the crosslinked or crosslinkable second layer material are well-known in the art. Examples of suitable catalysts are sulfonic acids, such as methanesulfonic acid and p-toluenesulfonic acid, and other acids such as citric acid, maleic acid, phthalic acid, etc. The catalysts may be used in the free acid form, but preferably they will be stabilized, such as by the use of an amine to neutralize the acid. Examples of such amines are ammonia, diisopropanolamine, and 2-amino-2-methyl-1-propanol. The only restriction is that the catalysts must be comparible with the other components of the system. These catalysts and stabilized catalysts are all well-known by those skilled in the art, and their selection will be within the capability of an ordinary artisan.

The aminoplast compositions may be applied to the second layer surfaces in a variety of ways, the object being to apply the material as a film which will provide uniform coverage. Typically, these materials will be provided as an aqueous solution comprising 4% or more solids, the solids level being increased to perhaps 60% or more as the desired thickness of the resulting coating is increased. It will be recognized, of course, that as the solids content increases, compatibility problems may be encountered such that cloudy solutions are obtained. This is especially true where the solution comprises water, even when a surfactant is present. The addition of small amounts of solvents can be used to help prevent compatibility problems.

The solvents which may be used comprise alcohols, ketones, and other organic materials which will be compatible with the aminoplast and polyol components. Often, however, because of environmental considerations, the use of organic solvents will not be preferred. Accordingly, it has been found preferable to utilize aqueous solutions or dispersions of the mixtures. In such circumstances, some difficulty has been encountered in providing clear, continuous films; however, these difficulties have been partially or completely overcome by including solvents, surfactants, or the like in the solution. Examples of such surfactants are non-ionic alkylphenoxyl polyoxyethylene ethanol surfactants such as the Igepal surfactants sold by GAF Corporation. Other surfactants such as silicone surfactants (e.g. Dow Corning DC-193) and organic fluorochemical surfactants (e.g. Fluorad FC-430 surfactant from 3M Company) will also assist in providing continuous films.

Surprisingly, it has also been discovered that certain types of surfactants may be useful to achieve improved stain resistance. Thus, a combination of certain fluoroaliphatic, non-ionic surfactants with at least one other type of surfactant (such an Igepal type) will provide improved stain resistance as compared with coatings which are prepared using either type of surfactant alone. It has been discovered that this result is attributable primarily to the fluoroaliphatic, non-ionic surfactant. One such surfactant which has been shown to be particularly effective is Fluorad FC-430, a surfactant sold by 3M Company.

The dry thickness of the applied aminoplast composition may range from very thin coatings on the order of one micron up to relatively thick coatings of 25 microns or more. It will be recognized, of course, that aminoplasts tend to produce rigid films, and as the film thickness increases, cracking of the film becomes more likely. The problem may be avoided somewhat by controlling the amount of coating solution (e.g., by pad coating as opposed to flood coating), and other methods known to the art. These factors may vary depending on the nature of the coating formulation.

The object of the present invention is to first provide a clear, continuous film on a second crosslinked or crosslinkable wear layer, and then to cure the film while in contact with the second wear layer, When considered in terms of the thickness of the second conventional wear layer material, a relatively thin first protective coating is applied to the top of the second material. While applicants herein do not wish to be bound by any particular theory of operability, it is believed that the composition comprising the polyol component and the aminoplast component reacts with residual reactive sites on the surface of the second wear layer material, whether or not the wear layer is crosslinked, and thereby provides a particularly effective chemical bond of the first protective coating to the main body of the second wear surface. The result is that surface coverings, and particularly floor coverings, may be obtained which provide long-lived high gloss and superior stain resistance. No synthetic surface covering presently known in the art can provide such characteristics.

Other techniques may also be used to enhance the aforementioned characteristics. Thus, crosslinked second layer material may first be exposed to corona discharge. This tends to make the surface more hydrophilic and, for aqueous solutions, makes the surface more receptive to the coating solution. As a result, the surface is more easily coated and good bonding results.

The present invention will be better understood by reference to the examples which follow, said examples being provided by way of illustration and not limitation.

EXAMPLES

Example 1

A polyurethane coating material is prepared from the following components:

| Ingredient | Weight (Grams) |
| --- | --- |
| Polyetherdiol (Union Carbide LHT 240) | 40.80 |
| Polyetherdiol (Union Carbide LHT 112) | 14.20 |
| Xylene solvent | 110.00 |
| Toluene solvent | 46.00 |
| Dimethyltin dineodecanoate catalyst (Witco UL-28) | 0.55 |
| Surfactant (Monsanto XA-677 Multiflow) | 0.30 |
| Light stabilizer (American Cyanamid UV-5411) | 0.20 |

These components were charged to a stirred, nitrogen-purged glass reactor and heated to 70° C. for one hour. A 44.90 gram quantity of 4,4'-diisocyanato dicylohexylmethane was added dropwise over a 30 minute period of time at a rate sufficient to maintain the temperature of the mixture at 70° C. After an additional two hour period of stirring and heating at 70° C., the product was cooled and roll coated onto a decorated sheet vinyl flooring. The coated structure was oven heated at 110° C. for five minutes to provide a 3.5 mil coating that was hard, tough and highly abrasion resistant. The stain resistance of the coated product was not outstanding in that it was readily stained with common household stains such as ballpoint pen ink, lipstick, mustard, brown paste shoe polish, hair dye and iodine.

Example 2

This example will illustrate a flooring structure which was treated according to the present invention. The structure of Example 1 was flow coated with the following aqueous composition.

| Ingredient | Weight (Grams) |
| --- | --- |
| Water | 94.0 |
| Melamine aminoplast (American Cyanamid Cymel 301) | 3.0 |
| 1,4-Cyclohexane dimethanol | 2.0 |
| Surfactant (GAF Igepal CO-610) | 0.5 |
| p-Toluenesulfonic acid | 0.1 |

The above composition provided a uniformly coated sample which was oven heated at 100° C. for twenty minutes to provide a dry, scratch-resistant, hard and glossy film. This film showed exceptional characteristics in resistant staining using the common stains referred to in Example 1. The film, which had a thickness of about two microns, was strongly bonded to the cured polyurethane film as indicated by the fact that it could not be removed with transparent tape, either before or after soaking in boiling water for one hour. The cured product also exhibited excellent heat and light stability.

Example 3

The structure of Example 1 was pad coated with a solution having the following composition:

| Ingredient | Weight (Grams) |
| --- | --- |
| Water | 91.0 |
| Melamine aminoplast (American Cyanamid Cymel 301) | 6.0 |
| 1,6-Hexanediol | 3.0 |
| Fluorochemical surfactant (3M Fluorad FC-430) | 0.1 |
| Surfactant (GAF Igepal CO-610) | 1.0 |
| p-Toluenesulfonic acid | 0.15 |

The above coating was applied at a wet thickness of about 10 mils and was heated in an air oven at 150° C. for seven minutes to provide a product having a 2-micron coating on the polyurethane wear layer. As with the product of Example 2, the film was strongly adhered to the polyurethane film. When exposed to the staining materials referred to in Example 1, the product showed better stain resistance than the product of Example 2. The gloss retention properties of Examples 1 and 3 were also examined by applying abrasive soil to both samples and subjecting both to a rotating wheel. These conditions, which simulate actual foot traffic wear conditions, provide a measure of scratch resistance by comparisons of gloss retention. The gloss, before and after testing, was measured using a Gardener 60° gloss meter. The product of Example 3 showed a retained gloss which was 50% better than that obtained for Example 1.

EXAMPLE 4

This example will illustrate the preparation of a product having a different polyurethane wear layer than that disclosed in Example 1. The following reactants were charged into a stirred, dry air-purged reactor.

| Ingredient | Weight (Grams) |
| --- | --- |
| 4,4'-Diisocyanato dicyclohexylmethane | 4508.2 |
| Antioxidant (Ionol) | 10.3 |
| 2-Ethylhexyl acrylate | 3332.4 |
| Dibutyltin dilaurate catalyst | 20.6 |
| 1,6-Hexanediol diacrylate | 2222.3 |

The mixture was heated at 55° C. and 1401.3 grams of 2-hydroxyethyl acrylate was metered into the reactor at a rate which did not allow the temperature to exceed 55° C. After one hour, the following polyesters were charged to the reaction mixture which had been cooled to 120° F.

| Polyester | Weight (Grams) |
| --- | --- |
| Triol (Hooker F2039 180) the reaction product of 1 mol glycerol, 3 mols of a 7:3 mixture of adipic acid and isophthalic acid, and 3 mols of 1,6-hexanediol; MW960; hydroxyl No. 175. | 3640.2 |
| Diol (Union Carbide PCP 0200), a polycaprolactone diol having a MW of 540 and a hydroxyl number of 207. | 3413.8 |

A small exotherm was observed, after which the reaction mixture was stirred at 60° C. for four hours. At the end of this period, infrared data showed the absence of isocyanate. The reaction mixture was cooled to 33° C. and the product (Product A) was placed in a Heresite lined drum.

Based on 100 parts by weight of Product A, 2.0% by weight of benzophenone photoinitiator was added together with 0.1% by weight of polyethylene glycol siloxane (Dow Corning DC-193). The coating thus formed had a viscosity of approximately 12,000 centipoises at room temperature and was comprised of 33.6% reactive diluent and 66.4% acrylate-capped urethane prepolymer.

A vinyl flooring material was coated using a 3-mil Bird blade applicator and the coated tile was passed under two in-line 200-watt-per-inch mediumpressure mercury lamps at a speed of about 10 feet per minute (three joules/cm$^2$ energy dose as determined by an International Light light meter) to cure the coating by photopolymerizing the ethylenically unsaturated components of the coating formulation. The wear layer coating on the vinyl support surface was tack free, hard and glossy; however, the coating was less than desirable as a durable clear coat for consumer application because it stained excessively using the staining agents of Example 1.

EXAMPLE 5

The structure of Example 4 was provided with a coating of the following composition.

| Ingredient | Weight (Grams) |
| --- | --- |
| Water | 96.0 |
| Melamine aminoplast (Monsanto Resimene 747) | 3.0 |
| 1,4-Cyclohexane dimethanol | 1.0 |
| Surfactant (GAF Igepal CO-610) | 0.25 |
| p-Toluenesulfonic acid | 0.10 |

The coated sample was oven heated at 100° C. for fifteen minutes to give a hard, glossy, scratchresistant film that had an excellent stain resistance when compared with the UV cured coating of Example 4. The top coating deposited from the aqueous solution after curing was two microns thick and was strongly bonded to the UV-cured coating.

EXAMPLE 6

This example will demonstrate that the present invention will also be applicable to partially cured or uncured UV-curable polyurethane coatings. In this example, the aqueous heat-curable aminoplast coating was applied to an uncured UV-curable coating in a wet-on-wet coating procedure. After applying the aqueous solution, the wet-on-wet material was exposed to an ultraviolet light source to cure the polyurethane layer, and then was exposed to a thermal cure so as to cure the aminoplast layer.

The composition as set forth in Example 4 was coated onto a vinyl flooring substrate using a 3-mil Bird blade applicator and, before exposure to ultraviolet light, the wet coating was overcoated with the aqueous aminoplast composition of Example 5 using a flow coater. The wet-on-wet coating was exposed to ultraviolet light curing by passing the sample under two in-line 200-watt-per-inch medium-pressure mercury lamps at a speed of about 10 feet per minutes (a 3 joules/cm$^2$ energy dose as determined by an International Light light meter) to cure the bottom layer of the coating. The partially cured structure was then oven heated at 150° C. for five minutes to thermally cure the upper layer. After the curing process, the thickness of the upper layer of the film was 1.8 microns. The fully cured sample was dry, glossy, scratch resistant and had excellent resistant to the household stains of Example 1.

EXAMPLE 7

This example will demonstrate that cosolvents can be employed for the aminoplast solution. The following ingredients were mixed and then flow coated onto a filled vinyl sheet flooring coated with a 3-mil thick ultraviolet light-cured coating of Example 4.

| Ingredient | Weight (Grams) |
| --- | --- |
| Acetone | 10.0 |
| Water | 90.0 |
| Melamine aminoplast (American Cyanamid Cymel 301) | 3.0 |
| 1,6-Hexanediol | 1.0 |
| Surfactant (GAF Igepal CO-610) | 0.2 |
| Fluorochemical surfactant (3M Fluorad FC-430) | 0.05 |
| p-Toluenesulfonic acid | 0.1 |

After heating the coated material at 150° C. for five minutes, a 2.2 micron thick coating was obtained which was hard, glossy, and scratch resistant. In addition, the material was strongly adhered to the polyurethane material and showed better stain resistance than the product as described in Example 5.

EXAMPLE 8

This example will illustrate the application of a coating comprising a totally organic solvent system. A vinyl filled flooring composition coated with a 3.5 mil layer of polyurethane coating was prepared and cured as described in the preceding examples. The filled vinyl flooring was first coated with the composition of Example 1 and cured at 100° C. for five minutes to form the cured urethane film. Subsequently, the cured sample was coated with the following composition.

| Ingredient | Weight (Grams) |
| --- | --- |
| Methyl ethyl ketone | 96.0 |
| Melamine aminoplast (American Cyanamid Cymel 301) | 3.0 |
| 1,6-Hexanediol | 1.0 |

| Ingredient | Weight (Grams) |
| --- | --- |
| Fluorochemical surfactant (3M Fluorad FC-430) | 0.05 |
| p-Toluenesulfonic acid | 0.1 |

The coated sample was heated at 150° C. for five minutes to form a 2 micron thick layer on the polyurethane coating. The coating was hard, glossy, and scratch resistant and showed comparable stain resistance to the coating of Example 7.

EXAMPLE 9

This example will illustrate the use of a partially alkylated methylolated melamine resin (Monsanto Resimene 730) in place of a substantially fully alkylated melamine resin (such as American Cyanamid Cymel 301). The following composition was prepared.

The above composition was flow coated onto the product of Example 4, dried and the coated sample was oven cured at 150° C. for five minutes. A hard, glossy continuous film about 2 microns thick was obtained on the surface of the product. The film had excellent adhesion to the underlying wear layer, and showed excellent stain resistance compared to the coating of Example 4. Gloss retention was also compared using the tests as described in Example 3. A 45% gloss retention was obtained for this sample as compared to only an 18% gloss retention for the product of Example 4.

EXAMPLE 10

This example will illustrate the preparation of a product having a UV-cured unsaturated polyester wear layer. The unsaturated polyester was prepared in two steps. In step 1, a polyester was prepared by charging the following components into a 5-liter, 4-neck, round-bottom flask:

| Ingredient | Weight (Grams) |
| --- | --- |
| Water | 96.0 |
| Melamine aminoplast (Monsanto Resimene 730) | 3.3 |
| 1,6-Hexanediol | 1.0 |
| Surfactant (GAF Igepal CO-610 | 0.25 |
| p-Toluenesulfonic acid | 0.1 |

The flask was equipped with a metal stirrer, nitrogen inlet, thermometer, and an upright steamheated column packed with glass helices. The pot temperature was slowly raised to 220° C.. The nitrogen flow was maintained at 1.25 standard cubic feet per hour (SCFH) over the duration of the reaction, and the water by-product was removed until the acid number was less than 1. Analysis of the product (Product A) gave a hydroxyl number of 84.2 and an acid number of 0.3

An acrylate-capped polyester was then prepared by charging the following components into a 2-liter-4-neck, round-bottom flask:

| Ingredient | Weight (Grams) |
| --- | --- |
| Isophthalic acid | 973 |
| Phthalic anhydride | 868 |
| 1,6-Hexanediol | 1148 |
| Neopentyl glycol | 427 |
| Cyclohexane dimethanol | 94 |
| Dibutyltin bis-lauryl mercaptide | 3.2 |

| Ingredient | Weight (Grams) |
| --- | --- |
| Surfactant (Foamkill 8R) | 1 drop |

| Ingredient | Weight (Grams) |
| --- | --- |
| Product A | 1041.0 |
| Toluene | 237.0 |
| Acrylic acid | 144.0 |
| Hydroquinone | 0.116 |
| p-Methoxyphenol | 0.231 |
| Sulphuric acid | 2.84 |

The temperature of the reaction mixture was raised to 105° C. with a nitrogen flow of 1.25 SCFH. A total of 21.7 mls of water was removed using a Barrett trap and a water cooled condenser. The composition was cooled to room temperature and the trap and condenser head were replaced with a distilling head. The temperature was raised until the mixture was stirrable and 1.33 grams of magnesium oxide and 11.6 grams of butyl benzyl phthalate were added. The temperature was raised to 105° C. and a vacuum (50mm Hg) was applied, thereby removing 170 mls of organic distillate. The final unsaturated polyester (Product B) had a viscosity of 112,600 cps, an acid number of 19.56 and a hydroxyl number of 10.6.

A coating composition comprising Product B was prepared as follows:

| Ingredient | Weight (Grams) |
| --- | --- |
| Product B | 100.0 |
| Acrylic acid | 7.5 |
| Photoinitiator (Irgacure 651) | 1.0 |
| Photoinitiator (Benzophenone) | 2.0 |

A 3-mil drawdown of this formulation was UVcured on a vinyl sheet flooring product as described in Example 4 and the product was subjected to the stains as described in Example 1. The material was found to stain badly. In addition, the sample was also subjected to a gloss retention test as described in Example 3 and gave a gloss retention of 16%.

EXAMPLE 11

The product of Example 10 was coated with the aminoplast solution as described in Example 3 and cured in an air oven at 150° C. for seven minutes to provide a coating having a thickness of about 2 microns. As with the product of Example 3, the film was strongly adhered to the unsaturated polyester coating as evidenced by a tape test. When subjected to a staining test comparable to that described in Example 10, the product showed excellent stain resistance. In addition, the gloss retention of this product was 78% as compared to the indicated value of 16% for the product of Example 10.

EXAMPLE 12

This example will illustrate the improved properties which were obtained using a fluorochemical surfactant in combination with a second surfactant. A composition was prepared containing the following components:

| Ingredient | Weight (Grams) |
| --- | --- |
| Water | 82.0 |
| Melamine aminoplast (American Cyanamid Cymel 301) | 12.0 |
| 1,6-Hexanediol | 6 |
| Surfactant (GAF Igepal CO-610) | 1.0 |
| Fluorochemical surfactant (3M Fluorad FC-430) | 0.09 |
| p-Toluenesulfonic acid | 0.63 |

The above coating was pad coated onto the UV cured polyester acrylate coating of Example 10 and cured for five minutes at 120° C. The abrasion resistance of the product was evaluated using the simulated traffic test as described above, and the percent gloss retention was calculated for this sample and for an uncoated polyester acrylate similar to that described in Example 10. Only an 8% gloss retention was obtained for the uncoated polyester as compared to a 74% gloss retention for the product of the present example.

EXAMPLE 13

This example will demonstrate that the present invention is applicable to coatings prepared from aqueous dispersions of epoxy and polyurethane resins crosslinked with a melamine-formaldehyde resin. The structure of Example 1 was coated with the following water-based composition using a 1-mil drawdown blade.

| Ingredient | Weight (Grams) |
| --- | --- |
| Water | 28.4 |
| Melamine aminoplast (Monsanto Resimene 745) | 12.0 |
| Epoxy resin dispersion, 55% solids (Interez CMD WJ55-3540) | 43.6 |
| Polyurethane dispersion, 30% solids (Sanncor. Sancure 847) | 13.3 |
| Surfactant (GAF Igepal CO-610) | 1.0 |
| Fluorochemical surfactant (3M Fluorad FC-430) | 0.2 |
| Ammonium hydroxide-neutralized dinonylnaphthalene disulfonic acid, pH 8.0 (King Nacure 155) | 4.8 |

The resin solids content of the coating was approximately 40 percent by weight. The above composition provided a uniformly coated sample which was oven-heated at 250° F. for ten minutes. The resulting dry film, which had a thickness of approximately 12 microns, was strongly bonded to the cured polyurethane and was glossy, flexible, and hard. It exhibited excellent resistance to the common household strains referred to in Example 1 and excellent heat and light stability.

EXAMPLE 14

This example will demonstrate that the present invention is applicable to coatings prepared from aqueous dispersions of epoxy and crosslinked polyurethane resins which are further crosslinked with a melamine-formaldehyde resin. The structure of Example 1 was coated with the following water-based composition using a 1-mil drawdown blade.

| Ingredient | Weight (Grams) |
| --- | --- |
| Water | 30.8 |
| Melamine aminoplast (Monsanto Resimene 745) | 12.0 |
| Epoxy resin dispersion, 55% solids (Interez CMD WJ55-3540) | 43.6 |
| Polyurethane dispersion, 35% solids (Mobay XW-124) | 11.4 |
| Surfactant (GAF Igepal CO-610) | 1.0 |
| Fluorochemical surfactant (3M Fluorad FC-430) | 0.2 |
| Ammonium hydroxide-neutralized dinonylnaphthalene disulfonic acid, pH 8.0 (King Nacure 155) | 4.8 |

The resin solids content of the coating was approximately 40 percent by weight. The above composition provided a uniformly coated sample which was oven-heated at 250° F. for ten minutes. The resulting dry film, which had a thickness of approximately 12 microns, was strongly bonded to the cured polyurethane and was glossy, flexible, and hard. It exhibited excellent resistance to the common household stains referred to in Example 1.

EXAMPLE 15

This example will demonstrate that the present invention is applicable to coatings prepared from aqueous dispersions or emulsions of epoxy, polyurethane, and acrylic resins crosslinked with a melamine-formaldehyde resin. The structure of Example 1 was coated with the following water-based composition using a 1-mil drawdown blade.

| Ingredient | Weights (Grams) |
| --- | --- |
| Water | 25.3 |
| Melamine aminoplast (Monsanto Resimene 745) | 3.4 |
| Epoxy resin dispersion, 55% solids (Interez CMD WJ55-3540) | 12.5 |
| Polyurethane dispersion, 30% solids (Sanncor Sancure 847) | 3.8 |
| Aqueous acrylic emulsion, (Rohm & Haas Rhoplex AC-1533) | 1.2 |
| Surfacant (GAF Igepal CO-610) | 0.5 |
| Fluorochemical surfactant (3M Fluorad FC-430) | 0.06 |
| p-Toluenesulfonic acid | 4.2 |

Prior to application the coating, with a resin solids content of approximately 24 percent by weight, was neutralized to pH 8.0 with ammonium hydroxide. The above composition provided a uniformly coated sample which was oven-heated at 250° F. for ten minutes. The resulting dry film, which had a thickness of approximately 12 microns, was strongly bonded to the cured polyurethane and was glossy, flexible, and hard. It exhibited excellent resistance to the common houshold stains referred to in Example 1.

EXAMPLE 16

This example will demonstrate that the present invention is applicable to coatings prepared from aqueous dispersions of polyurethane and rubber-modified epoxy resins crosslinked with a melamine-formaldehyde resin. The structure of Example 1 was coated with the following water-based composition using a 1-mil drawdown blade.

| Ingredient | Weight (Grams) |
| --- | --- |
| Water | 13.1 |
| Melamine aminoplast (Monsato Resimene 745) | 12.0 |
| Rubber-modified epoxy dispersion, 48.6% solids (Interez RDX 67961) | 57.1 |

-continued

| Ingredient | Weight (Grams) |
|---|---|
| Polyurethane dispersion, 30% solids (Sanncor Sancure 847) | 13.3 |
| Surfactant (GAF Igepal CO-610) | 1.0 |
| Fluorochemical surfactant (3M Fluorad FC-430) | 0.2 |
| Ammonium hydroxide-neutralized dinonyl-naphthalene disulfonic acid, pH 8.0 (King Nacure 155) | 4.8 |

The resin solids content of the coating was approximately 40 percent by weight. The above composition provided a uniformly coated sample which was oven-heated at 250° F. for ten minutes. The resulting dry film, which had a thickness of approximately 12 microns, was strongly bonded to the cured polyurethane and was glossy, flexible, and hard. It exhibited excellent resistance to the common household stains referred to in Example 1.

EXAMPLE 17

This example will demonstrate that the present invention will also be applicable to coatings prepared from water borne dispersion resins crosslinked with a methylated urea-formaldehyde resin (Monsanto Resimene U-980). The structure of Example 1 was coated with the following water based composition using a 1 mil Bird blade. Prior to application, the coating was:

| Ingredient | Weight (Grams) |
|---|---|
| Water | 54.0 |
| Urea-formaldehyde resin (Monsanto Resimene U-980) | 21.6 |
| Polyurethane dispersion, 30% solids (Sanncor Sancure 847) | 24.0 |
| Polyepoxy dispersion, 55% solids (Interez CMD-3540) | 78.5 |
| Surfactant (GAF Igepal CO-610) | 1.8 |
| Fluorochemical surfactant (3M Fluorad FC-430) | 3.6 |
| Ammonium hydroxide - neutralized dinonyl-naphthalene disulfonic acid, pH 8.0 (King Nacure 155) | 11.0 |

The resin solids content of the coating was about 40 percent. The above composition provided a uniformly coated sample which was oven-heated at 250° F. for ten minutes. The 12 microns thick film showed exceptional characteristics in resisting staining using the common stains referred to in Example 1. The film was strongly bonded to the polyurethane film and was hard, glossy, scratch-resistant and flexible.

EXAMPLE 18

This example demonstrated that this invention is also applicable to coatings prepared from water borne dispersion resins that are crosslinked with butylated urea-formaldehyde resin (Monsanto Resimene U-915). The urea-formaldehyde resin was obtained from Monsanto Company as a 75 weight percent solids in butanol and was mixed with water borne urethane and epoxy dispersion resins according to the following formulation.

| Ingredient | Weights (Grams) |
|---|---|
| Water | 54.0 |
| Urea-formaldehyde resin (Monsanto Resimene U-915) | 28.9 |
| Polyurethane dispersion, 30% solids (Sanncor Sancure 847) | 24.0 |
| Polyepoxy dispersion resin, 55% solids (Interez CMD WJ-3540) | 78.5 |
| Fluorochemical Surfactant (3M Fluorad FC-430) | 3.6 |
| Surfactant (GAF Igepal CO-610) | 1.8 |
| Ammonium hydroxide-neutralized dinonyl-naphthalene disulfonic acid, pH 8.0 (King Nacure 155) | 11.0 |

The formulation was coated on the structure described in Example 1 using a 1 mil Bird blade. The coating was oven-cured at 250° F. for ten minutes to give a 12 micron thick film that did not stain using the staining agents of Example 1. The film was flexible, hard, glossy, and stratch-resistant.

The present invention is not restricted solely to the descriptions and illustrations provided above, but encompasses all modifications envisaged by the following claims.

What is claimed is:

1. A process for providing a resilient floor covering comprising the steps of
   providing a resilient vinyl support surface,
   providing a crosslinked or crosslinkable second layer material on the support surface, the second layer material being selected from the group consisting of a moisture-cured polyurethane, a moisture-cured and UV-cured polyurethane, a UV-cured polyurethane, and an unsaturated polyester,
   coating the second layer material with a composition comprising a polyol component, an aminoplast component and an acid catalyst component, and
   subjecting the composite to thermal curing conditions,
   whereby the cured composition has the ability to conform to physical deformations of the crosslinked second layer material when cured, the cured composition having improved scratch and stain resistant properties relative to the properties of the cured crosslinked second layer material.

2. The process of claim 1 wherein the composition is an aqueous solution.

3. The process of claim 1 wherein the composition is an aqueous dispersion.

4. The process of claim 1 wherein the composition is an emulsion.

5. The process of claim 1 wherein the aminoplast component comprises, at least in part, a substantially fully methylolated and substantially fully alkylated melamine.

6. The process of claim 5 wherein the melamine is hexamethoxymethyl melamine.

7. The process of claim 1 wherein the acid catalyst component comprises, at least in part, a sulfonic acid.

8. The process of claim 1 wherein the composition additionally comprises water.

9. The process of claim 8 wherein the composition additionally comprises at least one surfactant.

10. The process of claim 8 wherein the composition additionally comprises at least two surfactants, the combination of which is suitable to provide enhanced stain resistance relative to identical compositions which do not comprise said surfactant.

11. The process of claim 10 wherein one of the surfactants is a fluoroaliphatic surfactant.

12. The process of claim 1 wherein the second layer material is moisture-cured before application of the composition.

13. The process of claim 1 wherein the second layer material is moisture-cured at the time of curing of the composition.

14. The process of claim 1 wherein the second layer material is radiation-cured before application of the composition, after application of the composition and before curing of the composition, or after curing of the composition.

15. The process of claim 11 wherein the other surfactant is a non-ionic alkylphenoxyl polyoxyethane ethanol.

* * * * *

UNITED STATES PATENT AND TRADEMARK OFFICE
CERTIFICATE OF CORRECTION

PATENT NO. : 4,855,165

DATED : August 8, 1989

INVENTOR(S) : Nicholas C. Bolgiano et al.

It is certified that error appears in the above-identified patent and that said Letters Patent is hereby corrected as shown below:

In the Specification, in column 9, the chart at lines 41 to 46 should be moved to following line 20 of column 9. In columns 9 and 10, the chart at column 9, line 64, to column 10, line 3, should be moved to following line 39 of column 9.

Signed and Sealed this

Twenty-ninth Day of May, 1990

Attest:

HARRY F. MANBECK, JR.

*Attesting Officer*  *Commissioner of Patents and Trademarks*